United States Patent
Hofacker et al.

(10) Patent No.: US 6,825,376 B2
(45) Date of Patent: Nov. 30, 2004

(54) NCO PREPOLYMERS PREPARED FROM ISOPHORONE DIISOCYANATE AND HAVING A LOW MONOMER CONTENT

(75) Inventors: Steffen Hofacker, Odenthal (DE); Rolf Gertzmann, Leverkusen (DE); Olaf Fleck, Bergisch Gladbach (DE); Gerhard Ruttmann, Burscheid (DE); Hanno Brümmer, Baytown, TX (US)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/316,364

(22) Filed: Dec. 11, 2002

(65) Prior Publication Data

US 2003/0120019 A1 Jun. 26, 2003

(30) Foreign Application Priority Data

Dec. 14, 2001 (DE) .......................... 101 61 386

(51) Int. Cl.[7] .............................. C08G 18/10
(52) U.S. Cl. ............. 560/158; 252/182.2; 252/182.22; 528/59; 528/76
(58) Field of Search .............. 528/76, 59; 252/182.2; 560/158

(56) References Cited

U.S. PATENT DOCUMENTS

| 3,278,459 A | 10/1966 | Herold ........................ 260/2 |
| 5,151,484 A | 9/1992 | Schmalstieg et al. ......... 528/45 |
| 5,187,253 A | * 2/1993 | Wolf ............................ 528/49 |
| 5,777,177 A | 7/1998 | Pazos .......................... 568/679 |
| 5,919,988 A | 7/1999 | Pazos et al. ................ 568/679 |
| 6,265,517 B1 | * 7/2001 | Stuart .......................... 528/28 |
| 6,417,313 B2 | 7/2002 | Spyrou ........................ 528/59 |
| 2001/0027242 A1 | 10/2001 | Spyrou ........................ 528/59 |

FOREIGN PATENT DOCUMENTS

| DE | 151 466 | 10/1981 |
| EP | 0 573 206 | 8/1998 |
| WO | 99/29752 | 6/1999 |

OTHER PUBLICATIONS

Seneker et al.; A New Generation Of Polyether Polyols; 1996; Paper 46; pp. 1–10.*

* cited by examiner

Primary Examiner—Rachel Gorr
(74) Attorney, Agent, or Firm—Joseph C. Gil; Thomas W. Roy; Gary F. Matz

(57) ABSTRACT

The present invention relates to solvent-free, NCO prepolymers having a residual IPDI monomer content of less than 2.0 wt. %, an NCO content of 2.0 to 5.0 wt. % and a viscosity of 5000 to 20,000 mPa·s, wherein the NCO prepolymers are the reaction products of i) 3-isocyanatomethyl-3,5,5-trimethylcyclohexyl isocyanate and
  ii) one or more polyethers prepared by the DMC catalyst process and having an OH-functionality of 1.80 to 2.00 at an NCO/OH equivalent ratio of 1.5:1 to 2.2:1.

The present invention also relates to a process for preparing these solvent-free, NCO prepolymers and to polyurethane coating, sealant, adhesive and/or embedding compositions containing the solvent-free, NCO prepolymers as a binder and/or binder component.

13 Claims, No Drawings

NCO PREPOLYMERS PREPARED FROM ISOPHORONE DIISOCYANATE AND HAVING A LOW MONOMER CONTENT

FIELD OF THE INVENTION

The present invention relates to NCO prepolymers having a low monomer content and prepared from isophorone diisocyanate (IPDI) and polypropylene oxide glycols, to a process for the production thereof and to their use.

BACKGROUND OF THE INVENTION

Due to their good lightfastness and weathering resistance, aliphatic and cycloaliphatic diisocyanates are used in high quality polyurethane coatings, sealants and embedding compositions (see for example Wagner Sarx, "Lackkunstharze" [synthetic coating resins], 5th edition, Carl Hanser Verlag, Munich, 1971, pages 153–173). As a consequence of increased environmental awareness, solvent-free systems have in particular attracted interest. One possible option for producing such systems is to use NCO prepolymers. A multitude of NCO prepolymers and binders obtained therefrom are known (for example EP-A 0 497 131 or EP-A 1 138 707).

Prior art NCO prepolymers are produced by reacting relatively high molecular weight polyhydroxyl compounds, such as polyether or polyester polyols, with excess quantities of di- or polyisocyanate. It is advantageous in this connection if the isocyanate groups exhibit different reactivities. This property of "selectivity" suppresses any unwanted monomer content. These products also exhibit low viscosities and better industrial processability.

Isophorone diisocyanate (3-isocyanatomethyl-3,3,5-trimethylcyclohexyl isocyanate, IPDI) has two such differently (selectively) reactive isocyanate groups. However, it is not straightforwardly possible to reduce the residual monomer content of a prepolymer produced from IPDI to below 2.0 wt. % (for example EP-A 0 497 131, Example 2, or EP-A 1 138 707, Comparative Example). To further reduce the monomer content, it is generally necessary to perform a subsequent, technically elaborate distillation step (thin film distillation process) in order to separate monomeric constituents, for example IPDI.

Another option is described in DD-A 151466, in which prepolymers having a low monomer content are produced by reacting di- or polyisocyanates with polyalcohols using hydroxy-functional organometallic catalysts. However, these prepolymers can only be produced with the use of solvents, some of which remain in the prepolymer. This is disadvantageous for reasons of occupational hygiene, especially when these prepolymers are subsequently used in paints for producing coatings in poorly ventilated areas. Also, a low residual monomer content of diisocyanate according to DD-A 151466 is only achieved by using elevated contents of hydroxy-functional organometallic catalysts. This means, however, that considerable proportions of isocyanate are consumed by reaction with the hydroxy function of the catalyst and are not available for further polymer synthesis. This chain-terminating function of the catalyst also has a disadvantageous effect on, for example, mechanical properties of the paints formulated from the prepolymers.

An object of the present invention is to provide solvent-free, NCO prepolymers prepared from IPDI and polyhydroxyl compounds and having a residual IPDI monomer content of <2.0 wt. %, which prepolymers should be directly usable without a distillation process for removing the monomers and do not exhibit the stated disadvantages.

It has surprisingly been found that this object may be achieved by using polypropylene oxide glycols, which have been produced using the DMC catalyst process (for example, U.S. Pat. No. 3,278,459, WO 97/29 146 or EP-A 0 573 206). Without any elaborate distillation step, the monomer content is less than 2.0 wt. % and thus lower than when conventional polypropylene oxide glycols produced using the KOH process are used.

SUMMARY OF THE INVENTION

The present invention relates to solvent-free, NCO prepolymers having a residual IPDI monomer content of less than 2.0 wt. %, an NCO content of 2.0 to 5.0 wt. % and a viscosity of 5000 to 20,000 mPa·s, wherein the NCO prepolymers are the reaction products of i) 3-isocyanatomethyl-3,5,5-trimethylcyclohexyl isocyanate and ii) one or more polyethers prepared by the DMC catalyst process and having an OH-functionality of 1.80 to 2.00 at an NCO/OH equivalent ratio of 1.5:1 to 2.2:1.

The present invention also relates to a process for preparing these solvent-free, NCO prepolymers by reacting i) 3-isocyanatomethyl-3,5,5-trimethylcyclohexyl isocyanate and ii) one or more polyethers prepared by the DMC catalyst process and having an OH-functionality of 1.80 to 2.00 at an NCO/OH equivalent ratio of 1.5:1 to 2.2:1 in the presence of at least one catalyst at 20 to 100° C.

Finally, the present invention relates to polyurethane coating, sealant, adhesive and/or embedding compositions containing the solvent-free, NCO prepolymers as a binder and/or binder component.

DETAILED DESCRIPTION OF THE INVENTION

The NCO prepolymers according to the invention have a residual IPDI monomer content of less than 2.0 wt. %, preferably less than 1.95 wt. %; an NCO content of 2.0 to 5.0 wt. %, preferably of 3.0 to 4.5 wt. %, and more preferably of 3.5 to 4.2 wt. %; and a viscosity of 5000 to 20,000 mPa·s, preferably 8000 to 15,000 mPa·s and more preferably 9000 to 13,000 mPa·s at 23° C. The NCO prepolymers are obtained by reacting 3-isocyanatomethyl-3,5,5-trimethylcyclohexyl isocyanate and one or more polyethers prepared by the DMC catalyst process and having an OH-functionality of 1.80 to 2.00, preferably 1.90 to 2.00 and more preferably of 1.98 to 2.00, at an NCO/OH ratio of 1.5:1 to 2.2:1, preferably 1.7:1 to 2.0:1 and more preferably of 1.80:1 to 1.98:1 in the presence of at least one catalyst at 20 to 100° C.

The solvent-free, NCO prepolymers according to the invention are produced by initially introducing IPDI together with a catalyst and then adding at least one polyether at a temperature of between 20° C. and 100° C.

The polypropylene oxide glycols are distinguished in that they have been produced from propylene oxide using a double metal cyanide catalyst (DMC catalyst) instead of the conventional potassium hydroxide, and consequently exhibit a greater OH-functionality and lower monool content than those which have been produced in conventional manner using potassium hydroxide as catalyst (c.f. for example U.S. Pat. No. 3,278,459, U.S. Pat. No. 3,404,109, U.S. Pat. No. 3,829,505, WO 97/29 146 or U.S. Pat. No. 3,941,849).

The polyethers preferably used to produce the solvent-free, NCO prepolymers NCO according to the invention are those having an average OH-functionality of between 1.98 and 2.00 and a number average molecular weight of 500 to 5000 g/mol, preferably 1000 to 2000 g/mol.

These polyether polyols are produced by polymerizing propylene oxide in the presence of a DMC catalyst, such as zinc hexacyano-cobaltate, at 130° C., for example, using the process described in WO 97/29,146 (Examples 1 to 5) with incremental addition of starter. Continuous starters which are suitable include water or low molecular weight polyols having a molecular weight of less than 300 g/mol, such as glycerol, propylene glycol, dipropylene glycol, ethylene glycol, trimethylolpropane and sorbitol.

Catalysts which may be used for the reaction of IPDI and the polyethers are known and include organometallic compounds of the elements aluminium, tin, zinc, titanium, manganese, iron, bismuth and zirconium. Examples include dibutyltin laurate, zinc octoate and titanium tetraisopropylate. Tertiary amines, such as 1,4-diazabicyclo[2.2.2]octane, are also suitable.

The invention is further illustrated but is not intended to be limited by the following examples in which all parts and percentages are by weight unless otherwise specified.

EXAMPLES

In order to ensure comparability of the resultant indices, the introduced quantities of raw materials were adjusted in accordance with previously determined equivalent weights.

The polyethers used in the following examples were produced in a polymerization process by reacting propylene oxide with the assistance of a DMC catalyst at 130° C. in accordance with the process described in WO 97/29,146, Examples 3–5, with continuous apportionment of starter.

Arcol® PPG 2000 is a polypropylene oxide glycol having a number average molecular weight (Mn) of 2000 g/mol can be produced as follows:

30 mg of zinc hexacyanocobaltate/tert.-butyl alcohol complex, which was produced according to Example 8-1 from EP-A 0 743 093, was suspended in 200 ml of toluene in a steel reaction vessel. 20 g of propylene oxide, which contained 1.9 wt. % of propylene glycol, was added to the reactor and heated to 130° C. to activate the catalyst. Once the internal pressure in the reactor had subsided, 300 g of propylene oxide with a propylene glycol content of 3.8 wt. % were apportioned continuously at 130° C. over a period of 2.5 hours. In this case, the continuous starter was propylene glycol. The resultant polyether polyol had a hydroxyl value of 56.2 mg of KOH/g and a number average molecular weight (Mn) of 2000 g/mol.

By analogy with the production of Arcol® PPG 2000, Arcol® PPG 1000 was also obtained as a polypropylene oxide glycol with a number average molecular weight (Mn) of 1000 g/mol.

Example 1

222.03 g (equivalent weight=111.44 g/equiv) of 3-isocyanatomethyl-3,5,5-trimethylcyclohexyl isocyanate (Desmodur® I, commercial product of Bayer AG, Leverkusen) were initially introduced under inert gas (nitrogen) with 0.10 g of benzoyl chloride, stirred and then combined with 1.00 g of dibutyltin laurate. After heating to 45° C., 549.89 g (equivalent weight=1003.58 g/equiv) of Arcol® PPG 2000 (polypropylene oxide glycol, $M_n$=2000 g/mol, commercial product, Bayer AG, Leverkusen) were apportioned. Once the theoretical NCO content of 7.9 wt. % had been reached, a further 249.28 g (equivalent weight=500.45 g/equiv) of Arcol® PPG 1000 (polypropylene oxide glycol, Mn=1000 g/mol, commercial product, Bayer AG, Leverkusen) were apportioned. Once addition was complete, the reaction mixture was heated to 60° C. until an NCO content of 3.9 wt. % was obtained. The temperature was then reduced to room temperature.

The prepolymer according to the invention had a viscosity of 10800 mPa·s (23° C., plate viscosimeter), an NCO content of 3.9 wt. % and a monomer content of IPDI of 1.80 wt. % (determined by gas chromatography).

Example 2

227.82 g (equivalent weight=111.44 g/equiv) of 3-isocyanatomethyl-3,5,5-trimethylcyclohexyl isocyanate (Desmodur® I, commercial product of Bayer AG, Leverkusen) were initially introduced under inert gas (nitrogen) with 0.10 g of dibutyltin laurate and stirred. After heating to 55° C., 538.59 g (equivalent weight=1003.58 g/equiv) of Arcol® PPG 2000 (polypropylene oxide glycol, $M_n$=2000 g/mol, commercial product, Bayer AG, Leverkusen) were apportioned. Once the theoretical NCO content of 8.3 wt. % had been reached, a further 255.78 g (equivalent weight=500.45 g/equiv) of Arcol® PPG 1000 (polypropylene oxide glycol, $M_n$=1000 g/mol, commercial product, Bayer AG, Leverkusen) were apportioned. After an NCO content of 3.9 wt. % had been reached, 0.1 g of benzoyl chloride was added and the temperature reduced to room temperature.

The prepolymer according to the invention had a viscosity of 11300 mPa·s (23° C., plate viscosimeter), an NCO content of 3.9 wt. % and a monomer content of IPDI of 1.90 wt. % (determined by gas chromatography).

Comparison Example 1

224.36 g (equivalent weight=111.58 g/equiv) of 3-isocyanatomethyl-3,5,5-trimethylcyclohexyl isocyanate (Desmodur® I, commercial product of Bayer AG, Leverkusen) were initially introduced under inert gas (nitrogen) with 0.10 g of benzoyl chloride, stirred and then combined with 1.00 g of dibutyltin laurate. After heating to 45° C., 546.15 g (equivalent weight=987.68 g/equiv) of Desmophen® 3600Z (polypropylene oxide glycol, $M_n$=2000 g/mol, commercial product, Bayer AG, Leverkusen) were apportioned. Once the theoretical NCO content of 7.9 wt. % had been reached, a further 250.68 g (equivalent weight=498.67 g/equiv) of Desmophen® 1600U (polypropylene oxide glycol, $M_n$=1000 g/mol, commercial product, Bayer AG, Leverkusen) were apportioned. Once addition was complete, the reaction mixture was heated to 60° C. until an NCO content of 3.9 wt. % was obtained. The temperature was then reduced to room temperature.

The prepolymer had a viscosity of 9200 mPa·s (23° C., plate viscosimeter), an NCO content of 3.9 wt. % and a monomer content of IPDI of 2.15 wt. % (determined by gas chromatography).

Comparative Example 2

230.00 g (equivalent weight=111.44 g/equiv) of 3-isocyanatomethyl-3,5,5-trimethylcyclohexyl isocyanate (Desmodur® I, commercial product of Bayer AG, Leverkusen) were initially introduced under inert gas (nitrogen) with 0.10 g of dibutyltin laurate and stirred. After heating to 55° C., 535.12 g (equivalent weight=987.68 g/equiv) of Desmophen® 3600Z (polypropylene oxide glycol, $M_n$=2000 g/mol, commercial product, Bayer AG, Leverkusen) were apportioned. Once the theoretical NCO content of 8.4 wt. % had been reached, a further 257.08 g (equivalent weight=498.22 g/equiv) of Desmophen® 1600U (polypropylene oxide glycol, $M_n$=1000 g/mol, commercial product, Bayer AG, Leverkusen) were apportioned. After an NCO content of 3.9 wt. % had been reached, 0.1 g of benzoyl chloride was added and the temperature reduced to room temperature.

The prepolymer had a viscosity of 9200 mPa·s (23° C., plate viscosimeter), an NCO content of 3.9 wt. % and a monomer content of IPDI of 2.07 wt. % (determined by gas chromatography).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A solvent-free, NCO prepolymer having a residual IPDI monomer content of less than 2.0 wt. %, an NCO content of 2.0 to 5.0 wt. % and a viscosity of 5000 to 20,000 mPa·s, wherein the NCO prepolymer is the reaction product of
   i) 3-isocyanatomethyl-3,5,5-trimethylcyclohexyl isocyanate and
   ii) one or more polyethers prepared by the DMC catalyst process and having an OH-functionality of 1.80 to 2.00
at an NCO/OH equivalent ratio of 1.7:1 to 2.0:1.

2. The NCO prepolymer of claim 1 wherein the reaction product of components i) and ii) is prepared at an NCO/OH equivalent ratio of 1.80:1 to 1.98:1.

3. The NCO prepolymer of claim 1 wherein the NCO prepolymer has a viscosity of 9000 to 13,000 mPa·s at 23° C.

4. The NCO prepolymer of claim 2 wherein the NCO prepolymer has a viscosity of 9000 to 13,000 mPa·s at 23° C.

5. The NCO prepolymer of claim 1 wherein the NCO prepolymer has a residual IPDI monomer content of less than or equal to 1.95 wt. %.

6. The NCO prepolymer of claim 2 wherein the NCO prepolymer has a residual IPDI monomer content of less than or equal to 1.95 wt. %.

7. The NCO prepolymer of claim 3 wherein the NCO prepolymer has a residual IPDI monomer content of less than or equal to 1.95 wt. %.

8. The NCO prepolymer of claim 4 wherein the NCO prepolymer has a residual IPDI monomer content of less than or equal to 1.95 wt. %.

9. The NCO prepolymer of claim 1 wherein said polyethers comprise polypropylene oxide glycols having a number average molecular weight (Mn) of 500 to 5000 g/mol.

10. The NCO prepolymer of claim 5 wherein said polyethers comprise polypropylene oxide glycols having a hydroxyl functionality of 1.98 to 2.00.

11. The NCO prepolymer of claim 1 wherein said polyethers comprise polypropylene oxide glycols having a number average molecular weight (Mn) of 1000 to 2000 g/mol and a hydroxyl functionality of 1.98 to 2.00.

12. A process for preparing a solvent-free, NCO prepolymer having a residual IPDI monomer content of less than 2.0 wt. %, an NCO content of 2.0 to 5.0 wt. % and a viscosity of 5000 to 20,000 mPa·s which comprises reacting
   i) 3-isocyanatomethyl-3,5,5-trimethylcyclohexyl isocyanate and
   ii) one or more polyethers prepared by the DMC catalyst process and having an OH-functionality of 1.80 to 2.00
at an NCO/OH equivalent ratio of 1.7:1 to 2.0:1 in the presence of at least one catalyst at 20 to 100° C.

13. A polyurethane coating, sealant, adhesive and/or embedding compositions containing the solvent-free, NCO prepolymers according to claim 1 as a binder and/or binder component.

* * * * *